(12) United States Patent
Oke

(10) Patent No.: US 8,902,389 B2
(45) Date of Patent: Dec. 2, 2014

(54) LIQUID CRYSTAL DISPLAY DEVICE

(71) Applicant: Panasonic Liquid Crystal Display Co., Ltd., Himeji-shi, Hyogo (JP)

(72) Inventor: Ryutaro Oke, Osaka (JP)

(73) Assignee: Panasonic Liquid Crystal Display Co., Ltd., Hyogo (JP)

( * ) Notice: Subject to any disclaimer, the term of this patent is extended or adjusted under 35 U.S.C. 154(b) by 89 days.

(21) Appl. No.: 13/766,444

(22) Filed: Feb. 13, 2013

(65) Prior Publication Data

US 2013/0215372 A1    Aug. 22, 2013

(30) Foreign Application Priority Data

Feb. 16, 2012    (JP) .................................. 2012-031221

(51) Int. Cl.
*G02F 1/1343* (2006.01)
*G02F 1/1345* (2006.01)
*G02F 1/1362* (2006.01)

(52) U.S. Cl.
CPC ........ *G02F 1/1345* (2013.01); *G02F 1/136209* (2013.01); *G02F 1/136286* (2013.01); *G02F 2201/40* (2013.01)
USPC .......................................................... 349/139

(58) Field of Classification Search
None
See application file for complete search history.

(56) References Cited

FOREIGN PATENT DOCUMENTS

| JP | 9-258163 | 10/1997 |
|----|----------|---------|
| JP | 10-048595 | 2/1998 |

*Primary Examiner* — Richard Kim
(74) *Attorney, Agent, or Firm* — Hamre, Schumann, Mueller & Larson, P.C.

(57) ABSTRACT

Provided is a liquid crystal display device in which a source line is divided in a screen and the screen is driven in a horizontally divided state. A divided position (40) between a source line (30*u*) in an upper display region and a source line (30*d*) in a lower display region is arranged at an intersecting part between a source line (30) and a gate line (32). A part of the source line (30), which overlaps with a gate line (32*a*) on which the divided position 40 is present, has a planar shape additionally including an expanded part (46) (protruding portion) having the same area as a removed part of the source line (30) at the divided position (40), as compared to a part of the source line (30), which overlaps with a gate line (32*b*) on which the divided position (40) is absent.

1 Claim, 4 Drawing Sheets

Prior Art

US 8,902,389 B2

LIQUID CRYSTAL DISPLAY DEVICE

CROSS-REFERENCE TO RELATED APPLICATION

The present application claims priority from Japanese application JP2012-031221 filed on Feb. 16, 2012, the content of which is hereby incorporated by reference into this application.

BACKGROUND OF THE INVENTION

1. Field of the Invention

The present invention relates to a liquid crystal display device, and more particularly, to a technology of horizontally dividing a screen into a plurality of display regions and vertically scanning those display regions in a parallel manner.

2. Description of the Related Art

Liquid crystal display devices are used in products such as a flat panel television set, a personal computer, a tablet terminal, and a smartphone. Particularly in the application of a large-sized panel represented by the flat panel television set, there are demands for increase in number of pixels such as 4K resolution (4K2K) and higher frame rate driving such as dual speed and quad speed, for image display in higher resolution, three-dimensional display, and improvement in moving image quality. Those demands require shorter data writing time to be allocated for each horizontal scanning line during vertical scanning of a screen, and hence there may arise a problem in that data writing to a pixel becomes insufficient when a general driving method is employed. As a countermeasure for this problem, there is known a division driving method of dividing the screen into a plurality of display regions, and writing data into the plurality of display regions in a parallel manner. For example, Japanese Patent Application Laid-open Nos. Hei 09-258163 and Hei 10-48595 each describe a liquid crystal display device employing the division driving method of horizontally dividing the screen into two upper and lower display regions and driving the two display regions.

For example, in the division driving method of horizontally dividing the screen into two upper and lower display regions $A_U$ and $A_D$ and driving the two display regions $A_U$ and $A_D$, the vertical scanning of sequentially selecting gate lines (scanning wiring lines) of the upper half display region $A_U$ and the vertical scanning of sequentially selecting gate lines of the lower half display region $A_D$ are performed in a parallel manner. In order to write video signals to pixel rows selected in the respective display regions $A_U$ and $A_D$ in a parallel manner, at the boundary between the regions $A_U$ and $A_D$, source lines (video wiring lines) are each divided into a source line arranged in the region $A_U$ and a source line arranged in the region $A_D$.

SUMMARY OF THE INVENTION

Dividing the source line in the screen affects operation of a pixel row in the vicinity of the divided position, and there has been a problem in that a difference in display state is generated between the pixel row and other pixel rows. One of the influences caused by the dividing relates to rubbing processing of an alignment film. FIG. 4 is a schematic partial plan view of a conventional liquid crystal display device, in which a screen is driven in a horizontally divided state, in the vicinity of the divided position of the source line. A TFT substrate includes thin film transistors (TFTs) 1, source lines 2, and gate lines 3, and further an alignment film stacked thereon. The alignment film has an uneven surface due to steps of the source lines 2 formed therebelow. The unevenness of the region in the vicinity of the source line 2 is different between the vicinity of a divided position 4 of the source line 2 and in a region of the source line 2 in the vicinity of a position other than the divided position 4. As a result, a region in which the alignment film cannot be sufficiently rubbed and the liquid crystal alignment cannot be controlled may expand on a pixel effective region (aperture region) side more in the region in the vicinity of the divided position 4 than in the region in the vicinity of the position other than the divided position 4. For example, as illustrated in FIG. 4, a region 5 in which alignment control is impossible, which is generated in the vicinity of the divided position 4, may expand into the pixel effective region in which a pixel electrode 6 is arranged. When liquid crystal is controlled to obtain a non-transmissive state through voltage application, liquid crystal in the region in which alignment control is impossible remains in a transmissive state. Thus, there has been a problem in that a pixel having an effective region adjacent to the divided position 4 and other pixels have a difference in brightness with respect to the same pixel data.

The present invention has been made to solve the above-mentioned problems, and provides a liquid crystal display device in which a screen is driven in a horizontally divided state, which is capable of preventing generation of a difference in display state between a pixel adjacent to a divided position of a source line and other pixels, thereby improving image quality.

According to an exemplary embodiment of the present invention, there is provided a liquid crystal display device, including: a pair of substrates arranged opposed to each other while sandwiching liquid crystal therebetween; scanning wiring lines extended on one of the pair of substrates along rows of pixels arranged in matrix, respectively, for applying a selection voltage which enables writing of a pixel signal to the pixel rows; and video wiring lines extended on the one of the pair of substrates along columns of the pixels, respectively, for supplying the pixel signal to corresponding one of the pixel rows, to which the selection signal is applied, the liquid crystal display device employing a division driving method of performing vertical scanning for each of a plurality of display regions obtained by horizontally dividing a screen, in which each of the video wiring lines is divided for each of the plurality of display regions, in which the each of the video wiring lines has a divided position arranged at a part intersecting with corresponding one of the scanning wiring lines, and in which the each of the video wiring lines has a part which overlaps with the corresponding one of the scanning wiring lines, on which the divided position is present, the part having a planar shape additionally including an expanded part having the same area as a removed part of the each of the video wiring lines at the divided position, as compared to a part of the each of the video wiring lines, which overlaps with corresponding one of the scanning wiring lines on which the divided position is absent.

According to another exemplary embodiment of the present invention, there is provided a liquid crystal display device, including: a pair of substrates arranged opposed to each other while sandwiching liquid crystal therebetween; scanning wiring lines extended on one of the pair of substrates along rows of pixels arranged in matrix, respectively, for applying a selection voltage which enables writing of a pixel signal to the pixel rows; video wiring lines extended on the one of the pair of substrates along columns of the pixels, respectively, for supplying the pixel signal to corresponding one of the pixel rows, to which the selection signal is applied, the liquid crystal display device employing a division driving method of performing vertical scanning for each of a plurality of display regions obtained by horizontally dividing a screen; and a light blocking film for covering a pixel separation region provided between the pixels adjacent to each other in a horizontal direction, in which each of the video wiring lines extends in a vertical direction through the pixel separation region, and is divided for each of the plurality of display regions by providing a divided position in the pixel separation region, and in which, in corresponding one of the pixels adjacent to the divided position, the light blocking film has a planar shape including a convex portion projecting in the horizontal direction in vicinity of the divided position, and in the pixels not adjacent to the divided position as well, the light blocking film has the planar shape so that the respective pixels have a uniform pixel aperture ratio.

In the exemplary embodiment of the present invention, the convex portion of the light blocking film covers a region in which alignment control of the liquid crystal is impossible, the region being generated in the vicinity of the divided position.

DETAILED DESCRIPTION OF THE INVENTION

In the following, modes for carrying out the present invention (hereinafter referred to as embodiments) are described with reference to the drawings.

[First Embodiment]

Figure 1:
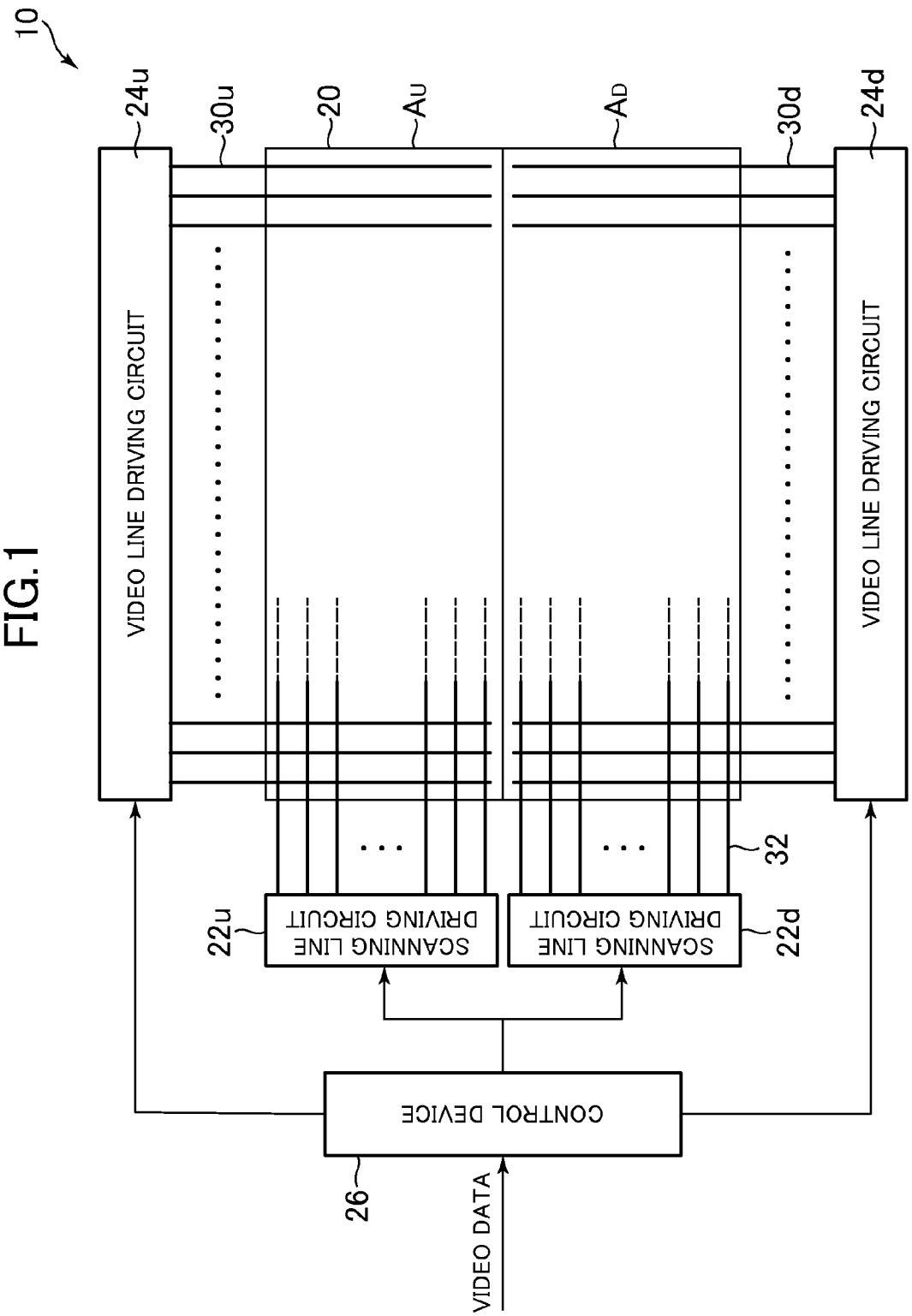
FIG. 1 is a schematic view illustrating a configuration of a liquid crystal display device according to embodiments of the present invention.

FIG. 1 is a schematic view illustrating a configuration of a liquid crystal display device 10 according to a first embodiment of the present invention. The liquid crystal display device 10 includes a liquid crystal panel 20, scanning line driving circuits 22$u$ and 22$d$, video line driving circuits 24$u$ and 24$d$, a control device 26, a backlight unit (not shown), and a backlight driving circuit (not shown).

The liquid crystal display device 10 employs, for example, an in-plane switching (IPS) method and an active matrix driving method. The liquid crystal panel 20 includes a color filter substrate and a TFT substrate, which are arranged opposed to each other with a gap, and liquid crystal is filled in the gap therebetween.

On a surface of the TFT substrate on the liquid crystal side, there are formed TFTs, source lines, gate lines, pixel electrodes, and a common electrode. Specifically, the pixel electrodes and the TFTs are respectively arranged in matrix so as to correspond to the pixel arrangement. In each pixel, the common electrode is arranged as well, which is made of a transparent electrode material similarly to the pixel electrode. Source lines 30 are provided for respective columns of the TFTs (lines in the vertical direction), and are each connected in common to sources of a plurality of TFTs in the corresponding column. Gate lines 32 are provided for respective rows of the TFTs (lines in the horizontal direction), and are each connected in common to gate electrodes of a plurality of TFTs in the corresponding row. Each of the source lines 30 is arranged along a pixel separation region provided between pixel columns, and each of the gate lines 32 is arranged along a pixel separation region provided between pixel rows. Further, the plurality of source lines 30 and the plurality of gate lines 32 are arranged so as to substantially intersect with each other. Each of the TFTs has a drain connected to the pixel electrode corresponding to the TFT.

On a surface of the color filter substrate on the liquid crystal side, a black matrix and a color filter are formed. The black matrix is a light blocking film which is formed in the pixel separation regions.

The TFT substrate and the color filter substrate each include an alignment film facing the liquid crystal. The alignment film is subjected to rubbing processing.

The conduction state of the TFTs is controlled in a row unit in accordance with a scanning pulse applied to the gate line 32. The pixel electrode is connected to the source line 30 via the TFT in an ON state, and a signal voltage (pixel voltage) based on a pixel value is applied from the source line 30. A predetermined common potential provided in common to respective pixels is applied to the common electrode via a common electrode wiring line. The alignment of the liquid crystal is controlled for each pixel by an electric field generated in accordance with a potential difference between the pixel electrode and the common electrode. In this manner, the transmittance of light entering from the backlight unit is changed so that an image is formed on a display surface.

The liquid crystal display device 10 employs a division driving method of horizontally dividing a screen into two upper and lower display regions $A_U$ and $A_D$, and the regions $A_U$ and $A_D$ are subjected to vertical scanning in a parallel manner.

In order to carry out division driving, each of the source lines 30 is divided into a source line 30$u$ arranged in the region $A_U$ and a source line 30$d$ arranged in the region $A_D$, and the source lines 30$u$ and 30$d$ are connected to the video line driving circuits 24$u$ and 24$d$, respectively. Further, the gate line 32 in the region $A_U$ is connected to the scanning line driving circuit 22$u$, and the gate line 32 in the region $A_D$ is connected to the scanning line driving circuit 22$d$.

A video signal received by a tuner or an antenna (now shown), or a video signal generated by another device such as an image reproducing device is input into the control device 26. Based on the input video signal, the control device 26 generates pixel data indicating a gradation value of each pixel and outputs the generated pixel data to the video line driving circuits 24$u$ and 24$d$, or generates a timing signal for each portion of the liquid crystal display device 10.

The scanning line driving circuits 22$u$ and 22$d$ select the gate lines 32 in the regions $A_U$ and $A_D$ in order, respectively, and each outputs a scanning pulse to the selected gate line 32. With this, TFTs in the selected pixel row are turned ON.

The video line driving circuits 24$u$ and 24$d$ output, in synchronization with the selection of the gate lines 32 performed by the scanning line driving circuits 22$u$ and 22$d$, voltages corresponding to each pixel data of the corresponding row to the source lines 30$u$ and 30$d$.

Figure 2:
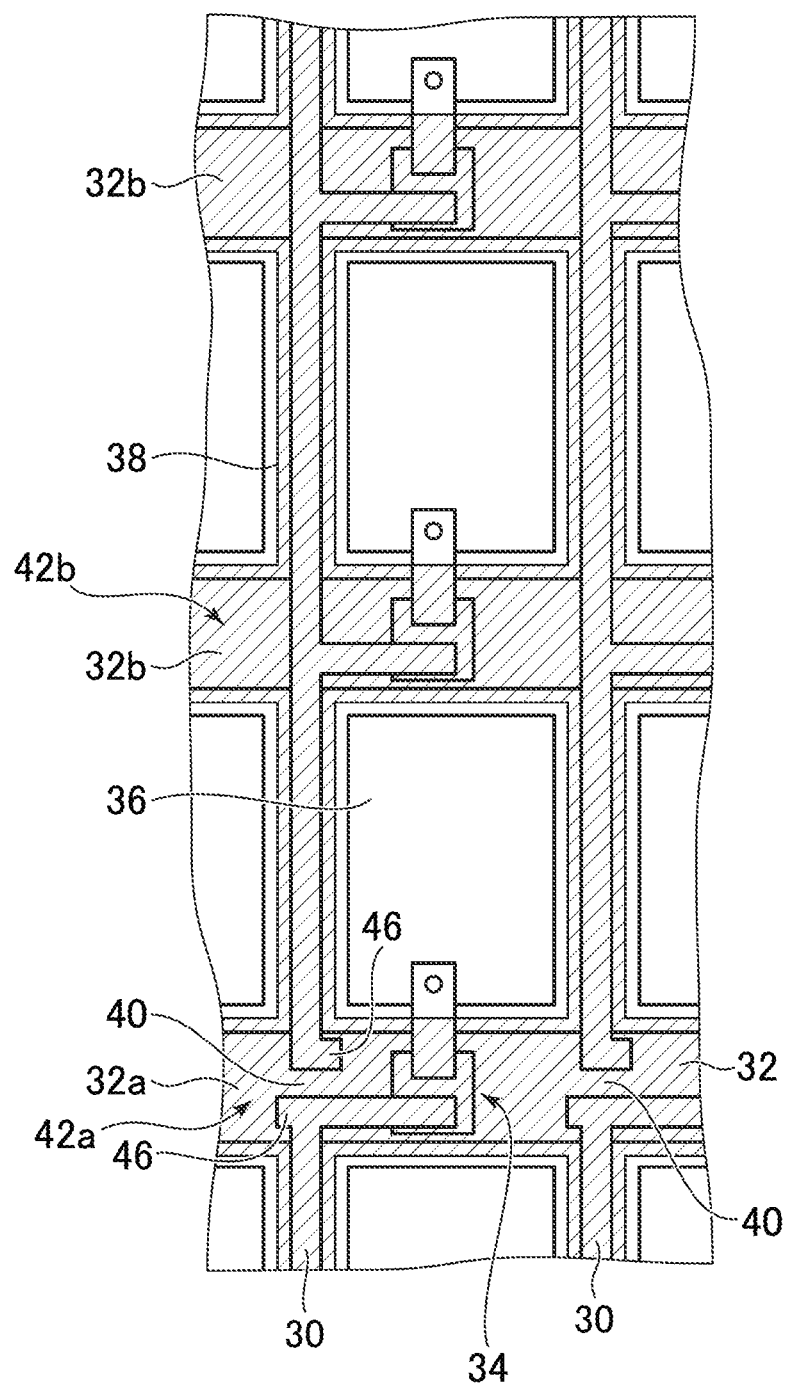
FIG. 2 is a schematic partial plan view of the liquid crystal display device according to a first embodiment of the present invention in the vicinity of a divided position of a source line.

FIG. 2 is a schematic partial plan view of the liquid crystal display device 10 in the vicinity of a divided position of the source line 30, and schematically illustrates shapes and arrangement of a TFT 34, the source line 30, the gate line 32, a pixel electrode 36, and a black matrix 38. In particular, the pixel electrode 36 is illustrated so as to represent a pixel effective region in which liquid crystal alignment is controlled, and hence the pattern of the pixel electrode may be different from the actual case. A divided position 40 of the source line 30, which is the boundary between the source lines 30u and 30d, is arranged at an intersecting part between the source line 30 and the gate line 32. When the planar shape is compared between a part of the source line 30, which overlaps with a gate line 32a on which the divided position 40 is present (overlapping part 42a), and a part of the source line 30, which overlaps with a gate line 32b on which the divided position 40 is absent (overlapping part 42b), the overlapping part 42a is different from the overlapping part 42b not only in that the overlapping part 42a does not have a wiring material in the divided position 40, but also in that the overlapping part 42a is additionally provided with an expanded part 46 for expanding the area of the overlapping part 42a.

The expanded part 46 has an area that is the same as the area of the eliminated wiring line of the divided position 40. With this, the amount of increase in load capacity of the gate line 32 due to the overlapping part between the source line 30 and the gate line 32 is the same between the gate line 32a arranged at the divided position 40 and the gate line 32b not arranged at the divided position 40. Thus, the respective gate lines 32 can have the same wiring load.

Figure 4:
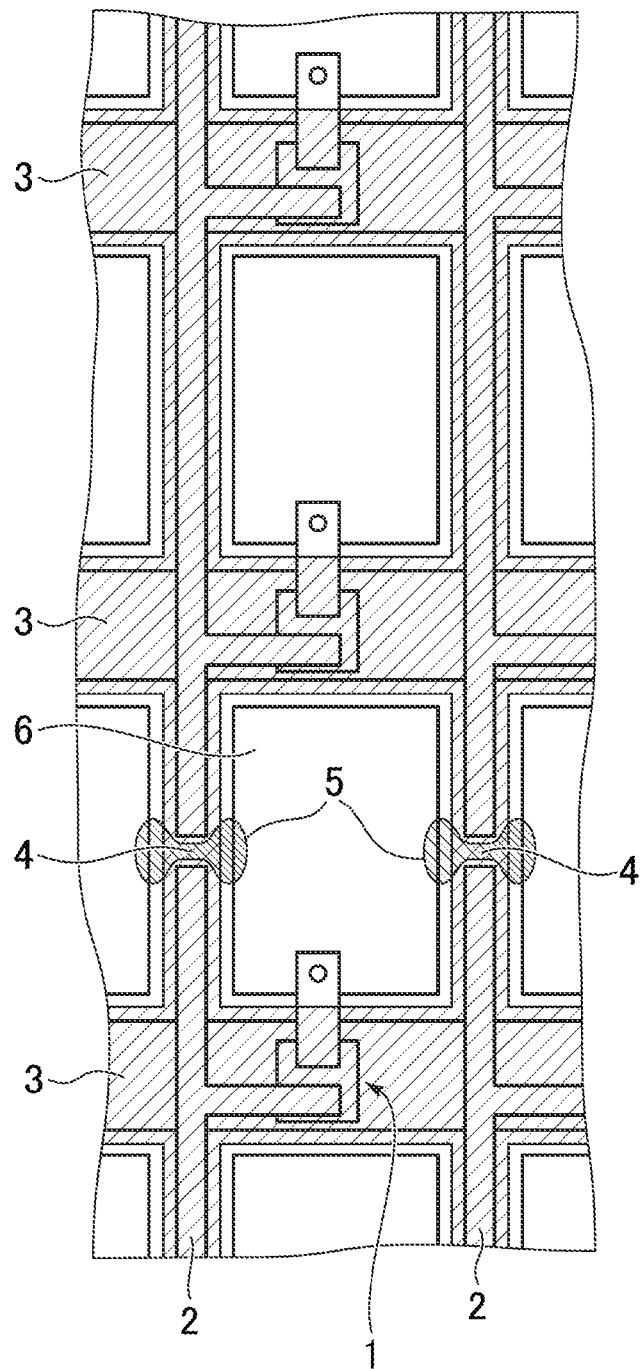
FIG. 4 is a schematic partial plan view of a conventional liquid crystal display device, in which a screen is driven in a horizontally divided state, in the vicinity of a divided position of a source line.

As described above, the present invention solves the problem in that a difference in display state is generated between the pixel row in the vicinity of the divided position 40 of the source line 30 and other pixel rows. Regarding this point, in this embodiment, the divided position 40 is arranged not on the pixel separation region located between the pixels adjacent to each other in the horizontal direction, but on the gate line 32. In this manner, it is possible to prevent the rubbing failure region caused by the divided position 40 (region 5 in FIG. 4) from generating in the pixel effective region. Therefore, it is possible to solve the above-mentioned problem in that a region in which alignment control is impossible is generated in the pixel aperture at the pixel row in the boundary part between the upper and lower display regions $A_U$ and $A_D$, which causes a difference in display state from other pixel rows.

On the other hand, when a part of the source line 30, which overlaps with the gate line 32, is merely removed to form the divided position 40, a difference in wiring load is generated between the gate line 32a on which the divided position 40 is present and the gate line 32b on which the divided position 40 is absent. Specifically, the wiring load of the gate line 32a is smaller than that of the gate line 32b. As a result, the waveform rounding of the scanning pulse applied to the gate line 32a is smaller than that of the gate line 32b. Therefore, only the pixel row selected by the gate line 32a differs from other pixel rows in the state and condition of the writing operation of the pixel voltage to the pixel electrode. That is, there arises a problem in that a difference in display state is generated between the pixel row selected by the gate line 32a and other pixel rows.

Specifically, the pixel row selected by the gate line 32a is faster in scanning pulse rise than other pixel rows, and hence the pixel voltage applied to the source line 30 is written in a better manner as compared to other rows. Therefore, even when the same pixel value is applied for the pixel row selected by the gate line 32a and a row adjacent thereto, there arises a problem in that the display of the row selected by the gate line 32a becomes brighter than that of the adjacent row.

Further, the above-mentioned problem in that a difference in display state is generated between the row selected by the gate line 32a and other pixel rows is caused even by the fact that a fluctuation (feed through) of a voltage $V_P$ of the pixel electrode varies in accordance with the waveform of the scanning pulse. This point is described in the following. In frame reversing driving, the polarity of the pixel voltage with respect to a potential $V_{COM}$ of the common electrode is reversed for each one frame. When the pixel voltage has a positive polarity, $V_P$ increases in the selected row when the scanning pulse is applied, while when the pixel voltage has a negative polarity, $V_P$ decreases. When the scanning pulse falls, $V_P$ slightly decreases due to the parasitic capacitance between the drain of the TFT (or the pixel electrode) and the gate line 32. The fluctuation of the voltage $V_P$ when the scanning pulse falls is the feed through voltage, which is represented by $\Delta V$.

The polarity of $\Delta V$ does not change by the frame reversion, and $\Delta V$ becomes larger as the fall of the scanning pulse is steeper. Therefore, a center voltage $V_{CNT}$ between $V_P$ set when the pixel voltage of a positive polarity is applied and $V_P$ set when the pixel voltage of a negative polarity is applied is different between the row selected by the gate line 32a and other rows. Specifically, the row selected by the gate line 32a has $V_{CNT}$ smaller than other rows. In this case, when there is a difference between $V_{CNT}$ and $V_{COM}$, a DC voltage (DC offset) is continuously applied to the liquid crystal, which may cause image burn-in. Therefore, $V_{COM}$ is adjusted so that a difference with respect to $V_{CNT}$ is small. At this time, $V_{COM}$ is adjusted to a suited value considering that $V_{CNT}$ may change in accordance with the pixel voltage. However, it is difficult to suitably adjust $V_{COM}$ while considering the influence of a shift of $V_{CNT}$ in the row corresponding to the gate line 32a. For example, even when $V_{COM}$ is suitably adjusted for the row in which the divided position 40 is absent, the difference between $V_{COM}$ and $V_{CNT}$ cannot be sufficiently reduced for the row corresponding to the gate line 32a. Therefore, for example, when an image of white display as a whole is displayed for one frame period, and then a halftone image is displayed, the residual image becomes more conspicuous in the row corresponding to the gate line 32a than in other rows. Therefore, a difference in display state is generated between the row corresponding to the gate line 32a and other rows.

In view of this, in this embodiment, as described above, the expanded part 46 is provided in the overlapping part 42a so that the respective gate lines 32 have a uniform wiring load. In this manner, the above-mentioned problem caused because the divided position 40 is arranged on the gate line 32 is solved.

In FIG. 2, as an example of the expanded part 46, there is provided a protruding portion protruding in the horizontal direction from each of the source lines 30 on both sides of the divided position 40, in other words, an end portion of each of the source lines 30u and 30d. The expanded part 46 may be provided to only one of the source line 30u and the source line 30d.

[Second Embodiment]

The schematic configuration of a liquid crystal display device according to a second embodiment of the present invention is basically the same as the liquid crystal display device 10 according to the first embodiment illustrated in FIG. 1. In the following description, components similar to those of the first embodiment are denoted by the same reference symbols for simple description. This embodiment is different from the first embodiment in the configuration of solving the problem in that a difference in display state is generated between the pixel row in the vicinity of the divided position of the source line 30 and other pixel rows. In the following, the difference from the first embodiment is described.

Figure 3:
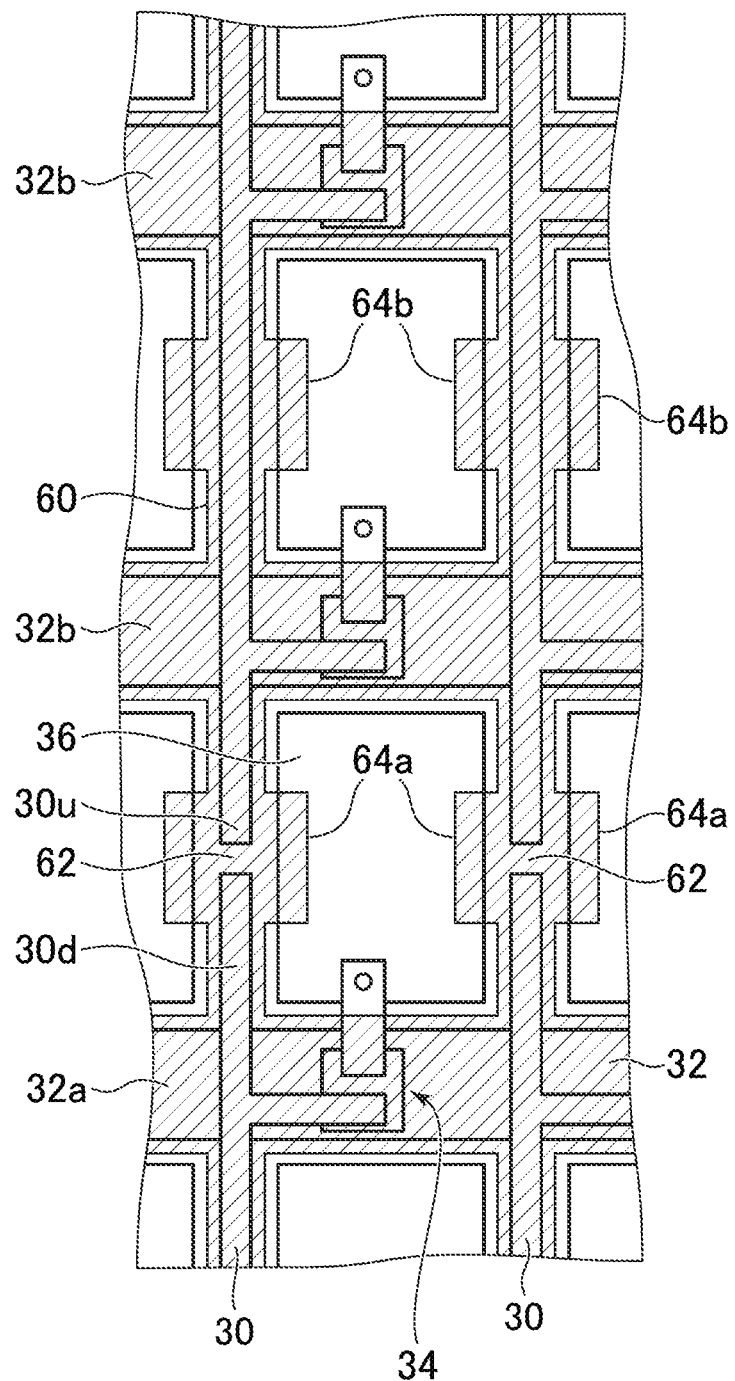
FIG. 3 is a schematic partial plan view of a liquid crystal display device according to a second embodiment of the present invention in the vicinity of a divided position of a source line.

FIG. 3 is a schematic partial plan view of the liquid crystal display device 10 in the vicinity of a divided position of the source line 30, and schematically illustrates shapes and arrangement of a TFT 34, the source line 30, the gate line 32, a pixel electrode 36, and a black matrix 60. In this embodiment, a divided position 62 of the source line 30, which is the boundary between the source lines 30u and 30d, is arranged not on the gate line 32, but on a pixel separation region located between pixels adjacent to each other in the horizontal direction. In the pixel adjacent to the divided position 62, the black matrix 60 has a planar shape including a convex portion 64a projecting in the horizontal direction in the vicinity of the divided position 62. The convex portion 64a is formed into a size and shape that can cover the region (region 5 in FIG. 4) in which alignment control of the liquid crystal is impossible, which is considered to be generated in the vicinity of the divided position 62 due to rubbing failure. When pixels are present on both right and left sides of the divided position 62, the convex portions 64a are formed on both right and left sides.

Further, in the pixel not adjacent to the divided position 62, the black matrix 60 has a planar shape including a convex portion 64b having the same size and shape as the convex portion 64a in the pixel adjacent to the divided position 62. With this, the respective pixels have a uniform pixel aperture ratio.

As described above, the present invention solves the problem in that a difference in display state is generated between the pixel row in the vicinity of the divided position 62 of the source line 30 and other pixel rows. Regarding this point, in this embodiment, the convex portion 64a covers the region in which the alignment control is impossible, which is generated in the vicinity of the divided position 62, and thus it is possible to prevent contribution to pixel brightness of light passing through the liquid crystal in the region in which the alignment control is impossible. Therefore, for example, in an image of black display as a whole, the pixel in the vicinity of the divided position 62 can perform black display similar to that of other pixels.

Further, the convex portion 64b is provided in the pixel not in the vicinity of the divided position 62 so that the respective pixels have the same aperture ratio. In this manner, even when the image data indicates brightness other than black, the pixel in the vicinity of the divided position 62 and other pixels are displayed at the same brightness.

Therefore, the problem in that a difference in display state is generated between the pixel row in the boundary part between the upper and lower display regions $A_U$ and $A_D$ and other pixel rows is solved.

As described above, according to the present invention, in the liquid crystal display device in which the screen is driven in a horizontally divided state, it is possible to prevent generation of a difference in display state between a pixel adjacent to the divided position of the source line and other pixels, thereby improving image quality.

While there have been described what are at present considered to be certain embodiments of the invention, it will be understood that various modifications may be made thereto, and it is intended that the appended claims cover all such modifications as fall within the true spirit and scope of the invention.

What is claimed is:

1. A liquid crystal display device, comprising:
a pair of substrates arranged opposed to each other while sandwiching liquid crystal therebetween;
scanning wiring lines extended on one of the pair of substrates along rows of pixels arranged in matrix, respectively, for applying a selection voltage which enables writing of a pixel signal to the pixel rows; and
video wiring lines extended on the one of the pair of substrates along columns of the pixels, respectively, for supplying the pixel signal to corresponding one of the pixel rows, to which the selection signal is applied,
  the liquid crystal display device employing a division driving method of performing vertical scanning for each of a plurality of display regions obtained by horizontally dividing a screen, wherein:
each of the video wiring lines is divided for each of the plurality of display regions;
the each of the video wiring lines has a divided position arranged at a part intersecting with corresponding one of the scanning wiring lines; and
the each of the video wiring lines has a part which overlaps with the corresponding one of the scanning wiring lines, on which the divided position is present, the part having a planar shape additionally including an expanded part having the same area as a removed part of the each of the video wiring lines at the divided position, as compared to a part of the each of the video wiring lines, which overlaps with corresponding one of the scanning wiring lines on which the divided position is absent.

* * * * *